United States Patent Office 3,493,657
Patented Feb. 3, 1970

3,493,657
THERAPEUTIC COMPOSITIONS OF N-ALLYL-14-HYDROXY - DIHYDRONORMORPHINANE AND MORPHINE
Mozes Juda Lewenstein, 80—49 Park Lane, Kew Gardens, N.Y. 11415, and Jack Fishman, Rego Park, N.Y.; said Fishman assignor to said Lewenstein
No Drawing. Continuation-in-part of applications Ser. No. 95,506, Mar. 14, 1961, and Ser. No. 292,491, July 2, 1963. This application Jan. 23, 1964, Ser. No. 339,580
The portion of the term of the patent subsequent to May 31, 1983, has been disclaimed
Int. Cl. A61k 27/00
U.S. Cl. 424—260    6 Claims This application is a continuation in part of applications Ser. No. 95,506 filed Mar. 14, 1961 (now U.S.P. 3,254,088 issued May 31, 1966) and Ser. No. 292,491 filed July 2, 1963 (now abandoned), It has been known that certain morphine derivatives, such as nalorphine, are antagonists against the respiratory depressing action of opium alkaloids, but in their therapeutic use as antagonists they have also undesired or even dangerous side effects, in view of which several authors warn e.g. of the use of nalorphine. (See L. A. Woods: The Pharmacology of Nalorphine (N-Allyl-normorphine), Pharmacol. Rev. 8, pp. 175–198, 1956, and Arthur S. Keats and Jane Telford "Subjective Effects of Nalorphine in Hospitalized Patients," Journ. Pharmacol. Exp. Ther 119, pp. 370–377 (1957).)

It is, therefore, one object of the present invention to provide an antagonist which does not have undesired side effects, such as confusion, dream states, frightening experiences, as described by the above mentioned authors in connection with the use of prior art antagonists.

Another essential disadvantage of prior art antagonists consists in that they must be applied after the administration of the analgesic separately, and cannot be administered in form of a mixture of the analgesic with the antagonist without reducing or affecting the desired effect of the analgesic in the mixture and simultaneously exercising the desired antagonistic effect in the mixture without the occurrence of undesired side effects.

It has now been discovered that by substituting the N-allylradical in 14-hydroxydihydro-nor-morphinone and mixing the compound thus obtained with 14-hydroxydihydromorphinone, which is a very strong analgesic, a composition is obtained which has a strong analgesic as wall as antagonistic effect, without the occurrence of undesired or dangerous side effects.

The following examples describe some specific embodiments of and best modes for preparing the compounds of the invention, to which the invention is not limited.

EXAMPLE 1

10 grams of 14-hydroxydihydromorphinone was converted into its diacetate by warming it in the steam bath with 80 ccm of acetic anhydride for about 2 hours. The acetic anhydride was removed on the water bath under a vacuum of about 30 mm. absolute pressure. The melting point of the residue was 220° C. The residue was taken up in 100 cc. of chloroform. An equal amount by weight of cyanogen bromide was added and the mixture was refluxed at about 60° C. for about 5 hours. After refluxing, the mixture was washed with 100 cc. of a 5% aqueous hydrochloride acid solution, dried over sodium sulfate and the chloroform removed by evaporation under a vacuum of about 30 mm. The residue had a melting point of 240° C.

The residue was then heated at about 90° C. for 16 hours on a steam bath with 300 cc. of 20% aqueous hydrochloric acid solution, and treated with a small amount, e.g. 1 gram of charcoal. The hydrochloric acid was then removed under a vacuum of 15 mm., the residue dissolved in 30 cc. of water and precipitated by the addition of 2.4 cc. of concentrated aqueous ammonia. The precipitate was filtered off and dried. It consists of 14-hydroxydihydro-nor-morphinone. It has no melting point and is soluble in ethanol.

The 14-hydroxydihydro-nor-morphinone was suspended in 200 ccm of pure ethyl alcohol, half its weight of sodium bicarbonate and half its weight of allyl bromide added and the resulting mixture was refluxed at about 75° C. for 48 hours. The solution was cooled e.g. to 10° C. and filtered and the alcohol removed under a vacuum of 30 mm. The residue was dissolved in chloroform and filtered. The chloroform was removed under a vacuum of 30 mm. and the residue was crystallized from ethylacetate. The crystallized product, N-allyl-14-hydroxydihydro-nor-morphinone, has a melting point of 184° C., is soluble in chloroform and insoluble in petroleum ether. The yield amounts to 20% based on the weight of the reacted 14-hydroxydihydronormorphinone.

Calculated for the free base, the N-allyl-hydroxydihydro-nor-morphinone contains C, 69.72% and H, 6.43%; N, 4.28%. Found: C, 69.54%; H, 6.87%; N, 4.43%.

The salts of the new compound can be prepared in conventional manner, e.g. by reacting the base with a substantially equivalent amount of an inorganic or organic acid in aqueous medium and recovering the salt thus formed by crystallization, or precipitation with a suitable water-miscible organic solvent. Or the base and acid are dissolved in a volatile organic solvent and the salt is recovered by evaporation of the solvent.

One gram of N-allyl-14-hydroxydihydro-nor-morphinone was dissolved in 50 cc. of ethanol. An equivalent of 6 N hydrochloric acid was added. Addition of ether precipitated the hydrochloric salt which could be crystallized from ethanolether.

EXAMPLE 3

One gram of N-allyl - 14 - hydroxydihydro-nor-morphinone was dissolved in 50 cc. of ethanol. An equivalent of tartaric acid was added and the solution was warmed. Evaporation of solvent yielded the bitartrate salt which could be crystallized from dilute ethanol.

Salts of 14-hydroxydihydro-nor-morphinone can be prepared substantially in the same manner as described in the above Examples 2 and 3.

As further examples of acids which can be used for preparing salts of the new bases, the following are mentioned: sulfuric acid, phosphoric acid, nitric acid, hydrobromic acid, oxalic acid, maleic acid, succinic acid, benzoic acid, and lactic acid.

The compounds prepared according to the above examples are of relatively low toxicity so that they can be used without the danger of toxic effects when administered to human subjects, and they show no undesired side effects.

EXAMPLE 4

An aqueous solution is prepared in conventional manner, which contains in 100 ml. of the solution the following ingredients:

| | Mg. |
|---|---|
| 14 hydroxydihydromorphinone hydrochloride | 150 |
| N-allyl - 14 - hydroxydihydronormorphinone hydrochloride | 20 |

The solution is used preferably by injection, e.g. by intravenous, as well as intramuscular or subcutaneous injection.

EXAMPLE 5

An aqueous solution is prepared in conventional manner, which contains in 100 ml. of the solution the following ingredients:

| | Mg. |
|---|---|
| 14 - hydroxydihydromorphinone sulfate | 100 |
| N-allyl - 14 - hydroxydihydronormorphinone phosphate | 10 | for parenteral use.

EXAMPLE 6

An aqueous solution is prepared in conventional manner, which contains in 100 ml. of the solution the following ingredients:

| | Mg. |
|---|---|
| 14 - hydroxydihydromorphinone lactate | 200 |
| N - allyl - 14 - hydroxydihydronormorphinone nitrate | 40 | for intravenous, or intramuscular, or subcutaneous injections.

EXAMPLE 7

An aqueous solution prepared in conventional manner, which contains in 100 ml. the following ingredients:

| | Mg. |
|---|---|
| 14 - hydroxydihydromorphinone hydrobromide | 300 |
| N-allyl - 14 - hydroxydihydronormorphinone oxalate | 80 |

EXAMPLE 8

30 mg. of 14-hydroxydihydromorphinone and 4 mg. N-allyl-14-hydroxydihydro-nor-morphinone are dissolved in 1 cc. of 0.1 aqueous n-HCl solution which is then diluted with distilled water till 10 cc.

In preparing the mixtures embodying the present invention, 7 to 35% of the N-allyl-14-hydroxydihydro-nor-morphinone compound, based on the weight of the 14-hydroxydihydromorphinone compound, is used.

The dose to be administered to human patients of an average weight of 60 kg. varies from 0.5 to 5 mg. of the 14-hydroxydihydromorphinone and 0.05 to 0.5 mg. of the N-allyl-14-hydroxydihydronormorphinone, all based on the salts.

It has now been further found that by mixing morphine or therapeutically applicable morphine salts with N-allyl-14 - hydroxydihydronormorphinone or its therapeutically applicable salts, likewise compositions are obtained which has a strong analgesic, as well as antagonistic effects, without the occurrence of undesired or dangerous side effects. In preparing such mixtures of morphine or its salts with N-allyl-14-hydroxydihydronormorphinone or its salts, 0.5–10% of the latter, based on the weight of the morphine or morphine salts, are used.

The dose to be administered to human patients of an average weight of 60 kg., varies from 3 to 30 mg. of the morphine compound and 0.01 to 3 mg. of the N-allyl-14-hydroxydihydronormorphinone, based on the weight of salts.

EXAMPLE 9

200 mg. morphine and 5 mg. of N-allyl-14-hydroxydihydronormorphinone are dissolved in 2 cc. of 0.1 N aqueous HCl solution which is then diluted with distilled water to 10 cc.

EXAMPLE 10

150 mg. of morphine sulfate and 2 mg. of N-allyl-14-hydroxydihydronormorphinone HCl are dissolved in 10 cc. of distilled water.

What is claimed is:

1. A therapeutically active composition containing as active ingredients a mixture of a compound selected from the group consisting of N-allyl-14-hydroxydihydronormorphinone and its therapeutically applicable salts, with a compound selected from the group consisting of morphine and its therapeutically applicable salts.

2. A therapeutically active composition as claimed in claim 1, containing 0.5–10% of the N-allyl-14-hydroxydihydronormorphinone compound, based on the weight of the morphine compound.

3. A composition as claimed in claim 2, in which the composition is an aqueous solution.

4. A composition as claimed in claim 2, in which the composition is a solid mixture.

5. A composition as claimed in claim 2, consisting of an aqueous solution of 150 mg. of morphine sulfate and 2 mg. of N-allyl-14-hydroxydihydronormorphinone HCl in 10 cc. of distilled water.

6. A composition as claimed in claim 2, consisting in each 10 cc. aqueous solution 200 mg. morphine and 5 mg. of N-allyl-14-hydroxydihydronormorphinone, both in form of hydrochloric acid salts.

References Cited

UNITED STATES PATENTS

| 2,683,106 | 7/1954 | Lewenstein. |
| 2,770,569 | 7/1956 | Fromherz. |

FOREIGN PATENTS

| 606,923 | 10/1960 | Canada. |

OTHER REFERENCES

Fed. Proc. 21:327, (March–April 1962).

Anesthesiology, 24, pp. 129–130 (January–February 1963).

J.A.M.A., vol. 183, No. 8, pp. 666–668, (Feb. 23, 1963).

ALBERT T. MEYERS, Primary Examiner

S. J. FRIEDMAN, Assistant Examiner